(12) United States Patent
Amin et al.

(10) Patent No.: US 6,569,370 B1
(45) Date of Patent: May 27, 2003

(54) INJECTION MOLDING SYSTEM AND METHOD USING CAVITY FLANGE AND NECK RING INSERT

(75) Inventors: Nadeem Amin, Brampton (CA); Thomas Schmitz, Mississauga (CA); Harvy Lahe, Richmond Hill (CA); Stephen Ferenc, Bolton (CA)

(73) Assignee: Husky Injection Molding System Ltd. (CA)

( * ) Notice: Subject to any disclaimer, the term of this patent is extended or adjusted under 35 U.S.C. 154(b) by 0 days.

(21) Appl. No.: 09/578,375

(22) Filed: May 25, 2000

(51) Int. Cl.[7] ............................................... B29C 45/26
(52) U.S. Cl. .................... 264/219; 264/328.1; 264/537; 425/533; 425/577
(58) Field of Search ............................. 264/219, 328.1, 264/537; 425/533, 556, 577, 552; 249/59, 135

(56) References Cited

U.S. PATENT DOCUMENTS

| | | |
|---|---|---|
| 4,432,530 A | 2/1984 | Marcinek |
| 4,571,171 A | 2/1986 | Blank et al. |
| 4,634,366 A | 1/1987 | Brun et al. |
| 5,114,655 A * | 5/1992 | Cole ........................... 249/144 |
| 5,232,718 A | 8/1993 | Miyazawa et al. |
| 5,470,221 A | 11/1995 | Gaiser |
| 5,498,150 A | 3/1996 | Check |
| 5,736,173 A * | 4/1998 | Wright et al. ............... 264/318 |
| 6,176,700 B1 | 1/2001 | Gellert |

FOREIGN PATENT DOCUMENTS

| | | |
|---|---|---|
| EP | 0 466 947 | 1/1992 |
| EP | 0 479 139 | 4/1992 |
| EP | 0 835 736 | 4/1998 |
| JP | 05 077232 | 3/1993 |
| JP | 06-126740 | 5/1994 |
| JP | 06 198719 A | 7/1994 |
| JP | 11-034152 | 2/1999 |
| JP | 2000-351151 A | 12/2000 |
| WO | WIPO 98/46410 | 10/1998 |
| WO | WIPO 00/26001 | 5/2000 |

OTHER PUBLICATIONS

Berins, Michael L.–editor, SPI Plastics Engineering Handbook of the Society of the Plastics Industry, Inc. Fifth Edition 1991, pp. 208–210.*
Rosato et al.–editors, Injection Molding Handbook, Third Edition, 2000, pp. 333–358.*
Patent Abstracts of Japan, vol. 1998, No. 03, Feb. 27, 1998 & JP 09 300438A (Aokiko Kenkyusho:KK), Nov. 25, 1997.

* cited by examiner

*Primary Examiner*—Jill L. Heitbrink
(74) *Attorney, Agent, or Firm*—Bachman & LaPointe, P.C.

(57) ABSTRACT

Injection molding system for molding a molded article and method for forming same, including a mold cavity for forming the molded article, wherein the mold cavity is defined at least in part by a mold core defining inner walls of the molded article, a first insert defining at least outer side walls of the molded article, and a second insert defining an outer wall of a neck of the molded article. In addition, a cavity plate at least partly surrounds the first insert and a cavity flange retains the first insert in the cavity plate.

18 Claims, 5 Drawing Sheets

INJECTION MOLDING SYSTEM AND METHOD USING CAVITY FLANGE AND NECK RING INSERT

BACKGROUND OF THE INVENTION

The present invention relates to improvements in injection molding systems for molding molded articles, such as preforms.

Conventional preform molds, such as those shown in U.S. Pat. No. 4,432,530 to Marcinek, U.S. Pat. No. 4,634,366 to Brun et al., U.S. Pat. No. 5,470,221 to Gaiser, U.S. Pat. No. 5,498,150 to Check and U.S. Pat. No. 4,571,171 to Blank et al., teach a one piece cavity insert mating with a pair of neck ring inserts for forming the outer surface of the preform. These show the mating surface to be a conical taper that is used to align the components when the mold is closed and clamped by the injection molding machine. It is well known in the art, that such a mating taper, when used for alignment purposes, must be made of dissimilar materials so that disadvantageous galling and premature wear does not occur. Consequently, in conventional molds the cavity and neck ring inserts are usually made of different steels and/or are heat treated to different hardnesses and/or may be plated with different coatings. Naturally, this may be time consuming and expensive and may not be entirely effective. If both the cavity insert and the neck ring inserts were to be made of the same steel at the same hardness, such as stainless steel, galling of the tapers would occur leading to rapid wear and poor operation of the mold.

U.S. Pat. No. 5,232,718 to Miyazawa et al. shows a preform mold in which movable inserts are placed between the mold cavity insert and the neck ring inserts. The patent teaches that such a design is needed for molding a handle feature onto the preform, or to clear an undercut diameter on the body of the preform. There is no teaching of use of the same material at the same hardness, such as stainless steel, nor is there any teaching of what material the different components are made of. Indeed, conventional knowledge would teach that each part that has a mating tapered alignment surface with its neighbor must be made of a different material and/or be at a different hardness and/or have a different surface coating so that galling and premature wear is avoided.

Accordingly, it is a principal objective of the present invention to provide an injection molding system and method which avoids the foregoing difficulties.

It is a further object of the present invention to provide a system and method that enables the use of inserts of the same material at the same hardness, as for example, the cavity insert and neck ring inserts.

Further objects and advantages of the present invention will appear hereinbelow.

SUMMARY OF THE INVENTION

In accordance with the present invention, the foregoing objects and advantages are readily obtained.

The injection molding system of the present invention for molding molded articles comprises: a mold cavity for forming said molded articles, wherein said mold cavity is defined at least in part by a mold core defining inner walls of said molded articles, a first insert defining at least outer side walls of said molded articles, and a second insert defining an outer wall of a neck of the molded articles; a cavity plate at least partly surrounding said first insert; and a cavity flange retaining said first insert in said cavity plate.

The first insert is preferably a cavity insert, and including a gate insert adjacent the cavity insert defining an outer bottom wall of the molded article, wherein the cavity plate at least partly surrounds the gate insert and wherein the cavity flange retains said cavity insert and gate insert in the cavity plate. Advantageously, all elements that substantially define the mold cavity are stainless steel, and/or all elements that substantially define the mold cavity are metal elements which are heat treated to substantially the same hardness.

The present invention also provides a method for forming an injection molding system for molding molded articles, which comprises: forming a mold cavity for molding said molded articles and defining the mold cavity at least in part by a mold core defining inner walls of said molded articles, a first insert defining at least outer side walls of said molded articles, and a second insert defining an outer wall of a neck of the molded articles; at least partly surrounding the first insert by a cavity plate; and retaining the first insert in the cavity plate by a cavity flange.

Further features and advantages of the present invention will appear hereinbelow.

BRIEF DESCRIPTION OF THE DRAWINGS

The present invention will be more readily understandable from a consideration of the accompanying drawings, wherein.

DETAILED DESCRIPTION OF PREFERRED EMBODIMENTS

Figure 1:
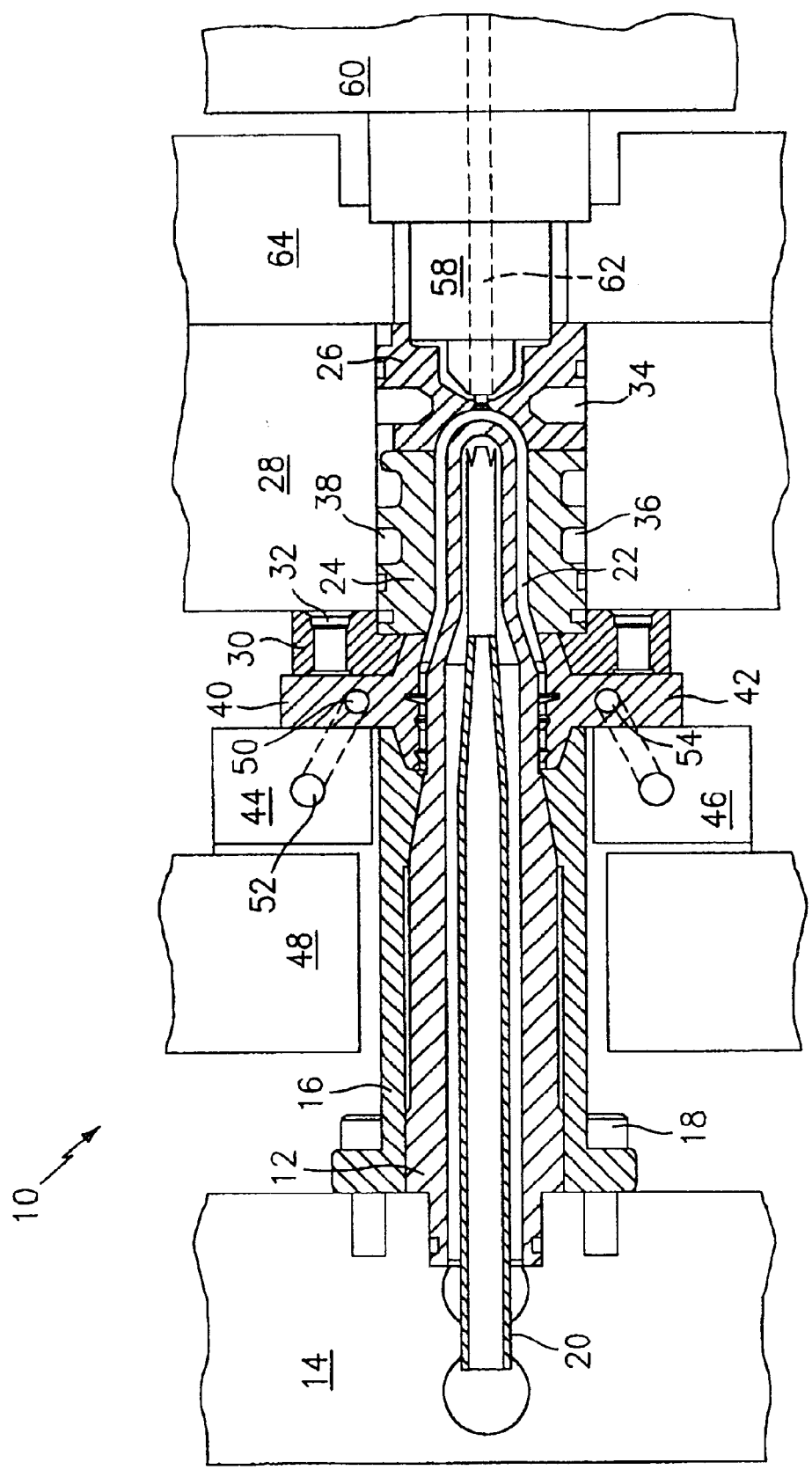
FIG. 1 is a cross sectional view through one stack of an injection molding system of the present invention for molding a preform in the mold closed position.
Figure 2:
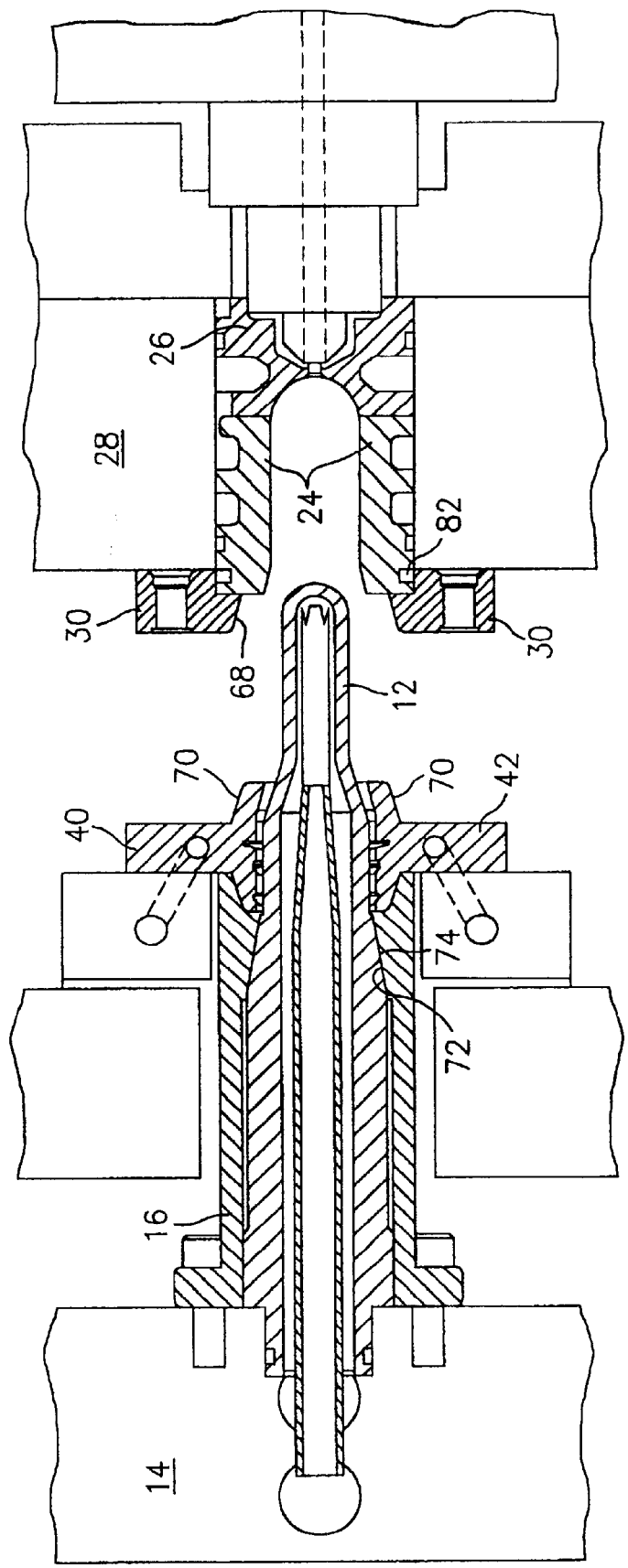
FIG. 2 is a cross sectional view similar to FIG. 1. in the partially open position.
Figure 3:
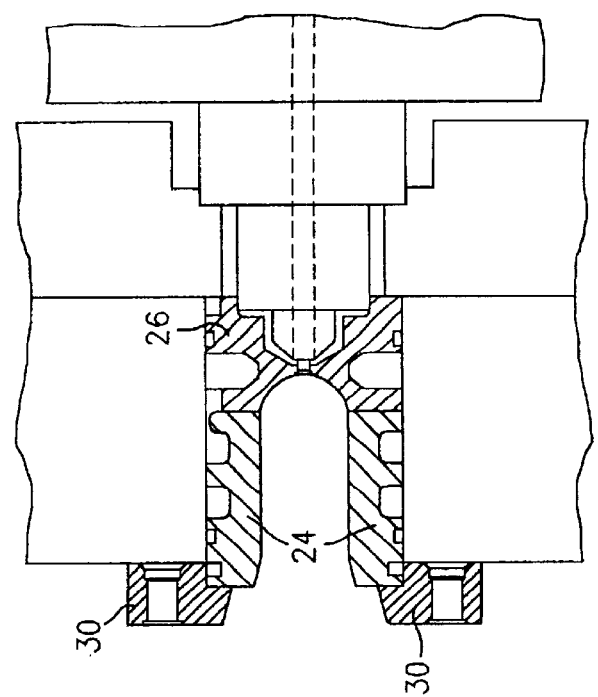
FIG. 3 is a cross sectional view similar to FIG. 1 in the fully open position with the stripper plate advanced;.
Figure 3:
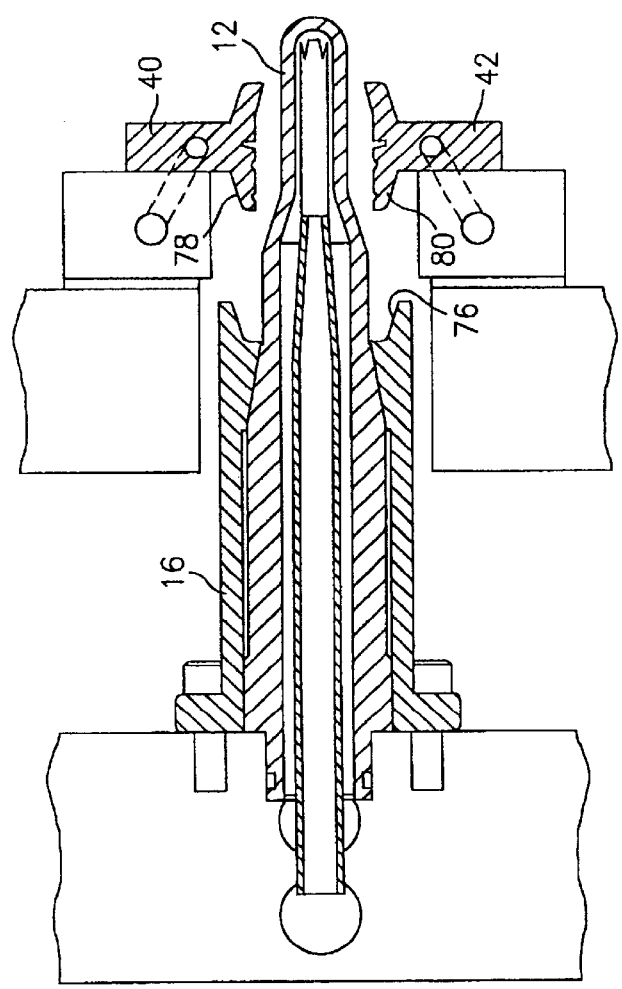
Figure 4:
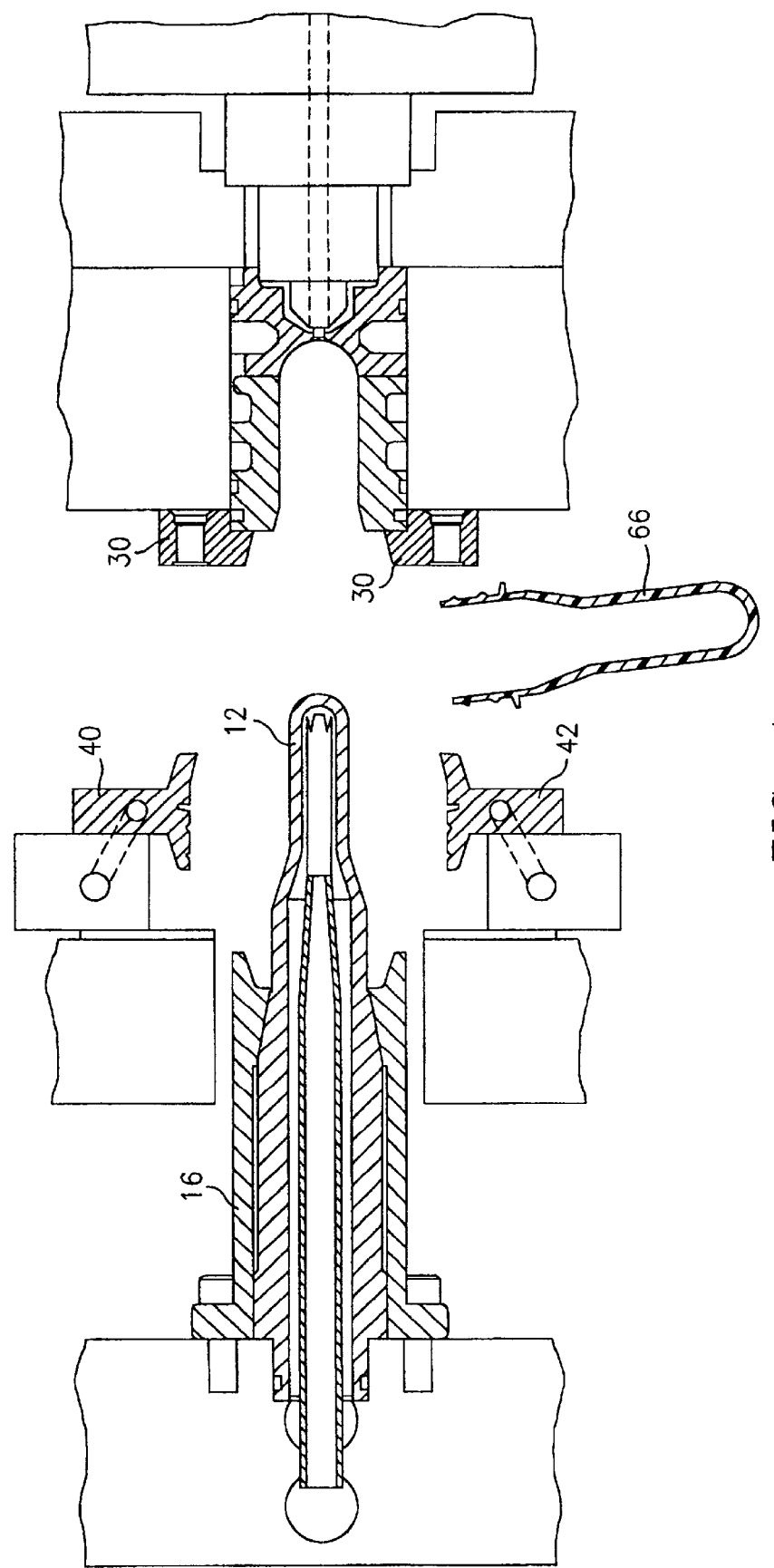
FIG. 4 is a cross sectional view similar to FIG. 1 in the fully open position with the neck ring halves separated.

Referring to the drawings, these show a sectioned portion of an injection mold for making preforms. The drawings show one set of inserts in the mold for making one preform. Collectively, these are called the stack. There may for example be up to 96 such stacks in one mold assembly. FIG. 1 shows the mold in the mold closed position ready for injection of the plastic into the stack. FIG. 2 shows the mold in the partially open position. FIG. 3 shows the mold in the mold fully open position and the stripper plate partially advanced to eject the molded part (not shown in FIG. 3) from the mold core. FIG. 4 shows the mold in the mold fully open position, the stripper plate fully advanced to eject the molded part which is also shown in FIG. 4, and the neck ring inserts fully separated, having completed the process of ejecting the molded part.

Naturally, the present invention is not limited to the particular mold configuration shown in the drawings, or to the preparation of preforms, or to a plurality of stacks in a mold assembly or a particular number of such stacks. The present drawings are exemplificative of a preferred embodiment of the present invention and variations will naturally occur to one skilled in the art.

Referring to FIGS. 1–4, an injection molding system 10 is provided with a stack which includes a mold core 12 fitted into core plate 14 and retained therein by core sleeve 16 and bolts 18. Mold core 12 may contain a cooling tube 20 for transmission of cooling fluid from a source (not shown) within the mold core to remove heat from the injected material in mold cavity 22 to cool and solidify the molded part in the mold cavity. The stack also includes cavity insert 24 and adjacent gate insert 26 that are retained in cavity plate 28 by cavity flange insert 30 and bolts 32. The cavity insert 24 and gate insert may be one piece, if desired. Cooling channels 34, 36 and 38 circulate cooling fluid from a source (not shown) through the cavity insert and gate insert to remove heat from the injected material. The stack further includes a pair of neck ring inserts 40, 42 that are mounted as with bolts (not shown) to corresponding slide bars 44, 46 carried by stripper plate 48. Cooling channels 50, 52, 54 and 56 circulate cooling fluid from a source (not shown) through the neck ring inserts to remove heat from the injected material. Molten material, as molten plastic, is conveyed to mold cavity 22 via hot runner nozzle 58, hot runner manifold 60, and channel 62 which are mounted to manifold plate 64.

Thus, as can be clearly seen in FIG. 1, mold cavity 22 is defined by the mold core 12 which defines the inner walls of the molded article, cavity insert 24, gate insert 26 and neck ring inserts 40, 42. The molded article as prepared in the embodiment of FIGS. 1–4 is a preform or parison 66 as shown in FIG. 4, but naturally other molded articles and other shapes and configurations may be prepared as desired.

Cavity flange insert 30 as shown in FIGS. 1–4 is not included in prior art stack constructions. Prior art cavity constructions typically include a flange for mounting to the cavity plate. For example, reference should be had to U.S. Pat. No. 5,498,150 to Check, U.S. Pat. No. 4,634,366 to Brun et al., and U.S. Pat. No. 5,470,221 to Gaiser which show retaining flanges on the core side of the cavity insert. Alternatively, U.S. Pat. No. 4,571,171 to Blank et al. shows the retaining flange on the cavity on the gate end trapped between the cavity plate and the manifold plate. In all cases the female mating taper lock surface in the cavity for locating and locking the cavity half of the mold with the core half, and corresponding to the male locking taper on the outer surface of the neck ring inserts is contained within the cavity insert itself.

The construction of the present invention, including the aligning tapers, is clearly shown in FIG. 2 which shows the mold in the partially open position. The female cavity half mating taper 68 is on cavity flange insert 30 and the male core half mating taper 70 is on neck ring inserts 40, 42. When the mold is closed, as shown in FIG. 1, these tapered surfaces engage and align the mold halves and each set of tapers individually aligns its corresponding stack within the mold assembly. In order to insure good alignment, a preload is designed into the assembly so that the tapered surfaces contact each other before the mold is fully closed. When a clamping force is applied to make the non-tapered surfaces touch, the preload distance disappears. The purpose of preloading tapers is to insure that alignment of the two components is effected before clamping is applied. A typical preload of about 0.0004" to 0.001" is preferably used. The clamping action of the machine when closing the mold overcomes this preloaded interference and in so doing assures that the stacks are correctly aligned when the mold is fully closed. Because this action of overcoming the preload deforms the tapered surfaces slightly at every molding cycle, a wearing action occurs at this interface. Consequently, the material properties of these mating surfaces must be designed so as to minimize the wear thereon in order to prolong the operational life of the mold. It is well understood that if two like surfaces wear against each other rapid deterioration of both surfaces may occur. This is termed "galling". In order to postpone the onset of such wearing of these surfaces, one of the following constructions is typically made:

the surfaces are made of two different materials;
    the surfaces, if made of the same materials, are heat treated to different hardnesses; and
    the surfaces, if made of the same materials, are surface treated with a deposit that provides dissimilar wearing properties between the two surfaces.

For these reasons, such mating tapered surfaces in molds heretofore generally made from different steels. Thus, for example, the cavity insert could be made from H-13 steel hardened to 49–51 Rockwell C and the mating neck ring inserts could be made from A-2 steel hardened to 56–59 Rockwell C. Alternatively, heretofore where the same steel is used for both components one of the tapered surfaces can be treated with titanium nitride to provide a harder wearing surface than its mating surface. This issue of selecting an appropriate material for the cavity is therefore affected by the material of the adjacent component bearing a mating tapered surface, and previous solutions to this problem are disadvantageous and not entirely effective.

The disadvantage of most steels used in mold construction is that they are prone to corrosion. Corrosion can occur on all surfaces of a steel component. In the stack most of the components have one portion exposed to an internal cooling fluid, usually chilled water containing rust inhibitors, and a second portion forming the molding surface and thereby exposed to external conditions. Also, for example, when the mold is in storage, corrosion from ambient conditions can occur if the surface is unprotected. In addition, corrosion can occur when operating in a high humidity environment. Prior art techniques to inhibit corrosion include for example chrome plating the molding surfaces of the insert or using other surface deposition techniques. These, however, have the disadvantage of adding cost and in some cases use chemical processes that are harmful to the environment thereby making them undesirable.

However, the family of stainless steels used in molds have intrinsically high corrosion resistance and consequently they do not need to be surface plated to minimize corrosion. Thus, stainless steel is an attractive alternative as it requires no additional treatment to inhibit corrosion. For example, 420 grade of stainless steel, typically heat treated to 49–52 Rockwell C, is a suitable material for preform molds. However, to use stainless steel to manufacture all of the components of the stack raises the issue of the wearing of the surfaces at the mating tapers. One alternative to overcome this problem is to heat treat the materials to different hardnesses for the mating components, but this has been found to have limited benefit.

An optimal solution is to isolate the mating tapered elements in such a way that they continue to provide the desired alignment feature but also allow the inserts in the stack that contain cooling fluid passages and molding surfaces to be made from stainless steel.

In accordance with the present invention, the prior art disadvantages are simply and readily overcome.

Thus, in accordance with the present invention, a cavity flange insert 30 is provided as a retaining means to hold the stainless steel cavity insert 24 in the cavity plate 28 and also to carry the mating female taper 68 that engages with the corresponding male tapers 70 on neck rings 40, 42, which neck rings are also made from stainless steel. Similarly, mold core 12 is also made from stainless steel as is gate insert 26 if a separate gate insert is used.

However, core sleeve 16 is made from a tool steel, such as H-13. The core sleeve contains two tapered surfaces. First core sleeve tapered surface 72 engages corresponding external taper 74 of mold core 12 to retain the mold core on core plate 14. The second core sleeve tapered surface 76 (see FIG. 3) engages the corresponding lower male tapers 78, 80 on the lower surfaces of neck ring inserts 40, 42. The neck ring inserts are also made of stainless steel. These second set of aligning tapers are also desirably preloaded to 0.0004" to 0.0001", like those of cavity flange 30 and should be constructed to minimize wear.

Therefore, in a preferred embodiment, the injection molding system of the present invention provides a cavity flange insert 30 and core sleeve 16 which may both desirably be made from H-13 steel heat treated to 49–51 Rockwell C, and gate insert 26, neck ring inserts 40, 42, cavity insert 24 and mold core 12, all defining mold cavity 22 in the mold closed position and all desirably made from stainless steel heat treated to 49–52 Rockwell C.

Figure 5:
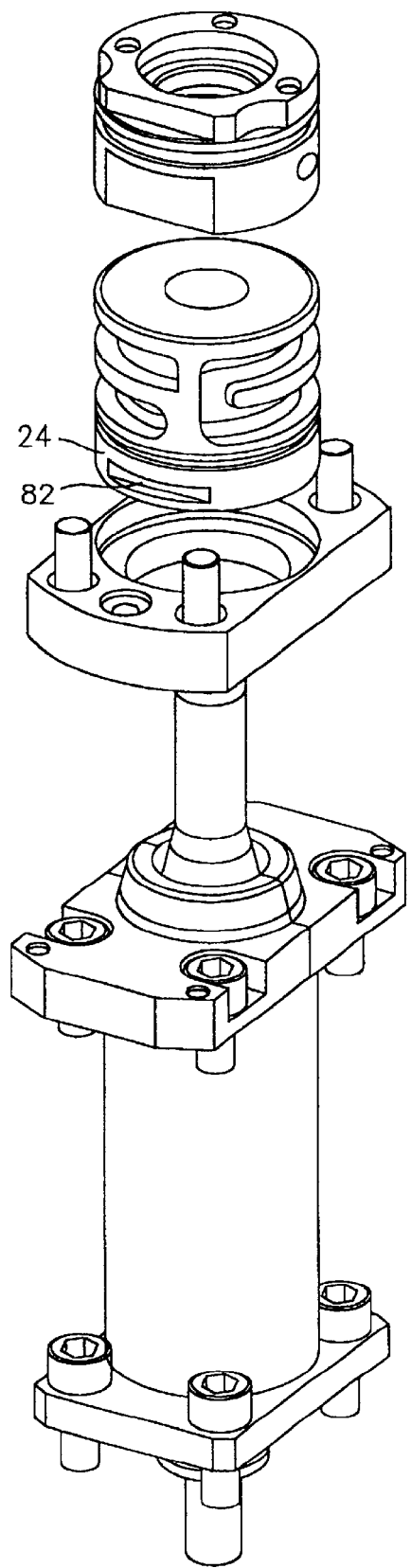
FIG. 5 is an isometric exploded view of the stack assembly.

FIG. 4 shows the mold in the fully open position with preform 66 ejected and with neck ring inserts 40, 42 separated. FIG. 5 shows an external isometric view of the stack. Slot 82 is cut into the sides of cavity insert 24 to enable one to pry the cavity insert from cavity plate 28 after the cavity flange insert 30 has been removed. This can also be seen in FIG. 2. This construction allows the cavity insert to be removed when the mold is mounted in the molding machine in order to service or replace the cavity insert and gate insert behind the cavity insert, if a separate gate insert is used.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A method for forming an injection molding system for molding molded articles, which comprises:
    forming a mold cavity for molding said molded articles in the mold closed position and defining said mold cavity at least in part by the following elements,
        a mold core defining inner walls of said molded articles,
        a first insert defining at least outer side walls of said molded articles, and
        a second insert defining an outer wall of a neck of the molded articles;
    at least partly surrounding said first insert by a cavity plate;
    retaining said first insert in said cavity plate by a cavity flange;
    wherein said first insert is a cavity insert, and including a gate insert adjacent said cavity insert defining an outer bottom wall of the molded articles, including at least partly surrounding said gate insert by said cavity plate, and retaining said cavity insert and gate insert in said cavity plate by said cavity flange, and including the step of providing that the second insert is a neck ring insert which defines the outer wall of the neck of the molded articles, including providing a slot in the cavity insert to enable removal of the cavity insert from the cavity plate when the cavity flange insert is removed.

2. A method according to claim 1, including the step of preparing a preform in said mold cavity.

3. A method according to claim 1, including the step of relatively moving (1) said cavity insert and gate insert relative to (2) said mold core, wherein said cavity insert and gate insert are relatively movable essentially parallel to said mold core.

4. A method according to claim 3, including a pair of said neck ring inserts, including the step of moving said neck ring inserts relative to said mold core and essentially perpendicular to said mold core.

5. A method according to claim 4, including engaging a female cavity half mating taper on said, cavity flange with a male core half mating taper on said neck ring inserts in the mold closed position.

6. A method according to claim 5, including retaining the mold core on a core plate by a core sleeve which engages the neck ring inserts in the mold closed position.

7. A method according to claim 4, including circulating cooling fluid in said cavity insert and in said neck ring inserts.

8. A method according to claim 1, including providing that all elements that define said mold cavity are stainless steel.

9. A method according to claim 1, including providing that all elements that define said mold cavity are metal elements which are heat treated to substantially the same hardnesses.

10. An injection molding system for molding molded articles, which comprises:
    a mold cavity for forming molded articles in the mold closed position, wherein said mold cavity is defined at least in part by the following elements,
        a mold core defining inner walls of said molded articles,
        a first insert defining at least outer side walls of said molded articles, and
        a second insert defining an outer wall of a neck of the molded articles;
    a cavity plate at least partly surrounding said first insert;
    a cavity flange retaining said first insert in said cavity plate;
    wherein said first insert is a cavity insert, and including a gate insert adjacent said cavity insert defining an outer bottom wall of the molded articles, wherein said cavity plate at least partly surrounds said gate insert and wherein said cavity flange retains said cavity insert and gate insert in said cavity plate, and wherein said second insert is a neck ring insert which defines the outer wall of the neck of the molded articles, including a slot in the cavity insert to enable removal of the cavity insert from the cavity plate when the cavity flange insert is removed.

11. A system according to claim 10, wherein said molded articles are preforms.

12. A system according to claim 10, wherein said cavity insert and gate insert are relatively movable with respect to said mold core essentially parallel to said mold core.

13. A system according to claim 12, including a pair of said neck ring inserts, and wherein said neck ring inserts are relatively movable with respect to said mold core essentially perpendicular to said mold core.

14. A system according to claim 13, including a female cavity half mating taper on said cavity flange which engages a male core half mating taper on said neck ring inserts in the mold closed position.

15. A system according to claim 14, including a core sleeve which retains the mold core on a core plate and which engages the neck ring inserts in the mold closed position.

16. A system according to claims 13, including cooling fluid passages in said cavity insert and in said neck ring inserts.

17. A system according to claim 10, wherein all elements that define said mold cavity are stainless steel.

18. A system according to claim 10, wherein all elements that define said mold cavity are metal elements which are heat treated to substantially the same hardnesses.

* * * * *